United States Patent [19]

Hall et al.

[11] Patent Number: 5,476,201
[45] Date of Patent: Dec. 19, 1995

[54] VEHICLE ATTACHED BICYCLE CARRYING ASSEMBLY

[75] Inventors: Mark D. Hall, Rochester; Darrel L. Morley, Troy; William A. Dayton, Northville; Donald R. Behm, Dryden, all of Mich.

[73] Assignee: Chrysler Corporation, Highland Park, Mich.

[21] Appl. No.: 367,445

[22] Filed: Dec. 29, 1994

[51] Int. Cl.$^6$ .................................................. B60R 9/10
[52] U.S. Cl. ........................... 224/492; 224/924; 224/309; 224/324; 224/326
[58] Field of Search ..................................... 224/492, 493, 224/494, 533, 537, 309, 324, 924, 320, 321, 322, 323, 325, 326, 310, 311; 296/180.1, 180.2; 414/462

[56] References Cited

U.S. PATENT DOCUMENTS

| | | | |
|---|---|---|---|
| 3,848,784 | 11/1974 | Shimano et al. | 224/323 |
| 4,921,152 | 5/1990 | Kemming | 224/924 |
| 5,230,449 | 7/1993 | Collins et al. | 224/924 |
| 5,269,446 | 12/1993 | Biehn | 224/924 |
| 5,292,045 | 3/1994 | Mandel | 224/321 |

FOREIGN PATENT DOCUMENTS

| | | | |
|---|---|---|---|
| 143065 | 5/1985 | European Pat. Off. | 224/309 |
| 2531021 | 2/1984 | France | 224/329 |
| 2621683 | 12/1977 | Germany | 224/324 |

Primary Examiner—Henry J. Recla
Assistant Examiner—Gregory M. Vidovich
Attorney, Agent, or Firm—Mark P. Calcaterra

[57] ABSTRACT

A vehicle mounted bicycle carrying assembly for supporting at least one bicycle in an upward standing position on the upper surface of a vehicle for transport by the vehicle includes first and second laterally spaced and longitudinally extending rail members affixed to the roof, and an elongated member adapted to retain the at least one bicycle for pivotally movement between a first position and a second position about an axis. The axis is substantially coincident with the elongated member. A first end portion of the elongated member is adapted to be attached to one of the rail members and a second end portion of the elongated member is adapted to be attached to the other of the rail members. In the preferred embodiment, the assembly further comprises a permanently spoiler attached to the deck lid. The spoiler integrally includes a longitudinally extending member including a channel adapted to receive the rear wheel of the at least one bicycle. When attached to the vehicle through the assembly of the present invention, the bicycle can be pivoted about its fork to thereby provide access to a rear located storage compartment by moving the deck lid to an open position.

18 Claims, 2 Drawing Sheets

5,476,201

VEHICLE ATTACHED BICYCLE CARRYING ASSEMBLY

TECHNICAL FIELD

The subject invention relates, in general, to a vehicle mounting bicycle carrying assembly. More particularly, the present invention relates to a vehicle mounting bicycle carrying arrangement which is operable to permit a bicycle mounted on a vehicle to rotate between a first position secured for transportation and a second position for providing access to the interior of a rear deck lid.

BACKGROUND OF THE INVENTION

Recently, there has been a significant increase in the popularity of the sport of bicycling. In addition to leisurely neighborhood excursion, bicycling is often enjoyed on vacations, trail rides and during competitions. These and other similar activities often require a bicycle rider to transport his or her bicycle by vehicle to a desired remote location. Heretofore, a number of devices have been developed addressing the difficulties associated with the transportation of bicycles. These prior devices disclose various arrangements for removably mounting one or more bicycles to the exterior of an automotive vehicle or towing one or more bicycles behind a vehicle.

The prior devices used to tow one or more bicycles behind a vehicle includes U.S. Pat. No. 5,232,134, issued Aug. 3, 1993 to Allen. Allen discloses a bicycle carrying system for transporting bicycles behind a motorized vehicle which includes a frame adapted to connect to a hitch of the vehicle. The system further includes a plurality of elongated arms extending radially from a bottom plate attached to the frame. Fastening members are provided for selectively securing a bicycle to each of the elongated arms.

Other prior art devices are adapted to cooperate with the vehicle's trailer hitch without the incorporation of a trailer-type device. U.S. Pat. No. 5,228,607, issued Jul. 20, 1993 to Tolsdorf, discloses such a device that includes a pair of arms each having an end adapted to engage a ball hitch on a vehicle and a foldable cross-piece interconnecting the arms. U.S. Pat. No. 5,303,857, issued Apr. 19, 1994 to Hewson, discloses a bicycle carrier for mounting on a trailer hitch of a vehicle. The carrier includes a bracket for attachment to the trailer hitch and an elongated, generally L-shaped support pivotally mounted to the bracket. The support is adapted to removable attach to the bicycle.

Still other prior devices have been directed to various arrangements for securing one or more bicycles to the rear of a vehicle. U.S. Pat. No. 5,230,449 issued Jul. 27, 1993 to Collins, discloses a collapsible bicycle carrier for use on a vehicle having a hatch cover. The carrier includes a plurality of flexible lower support straps and a plurality of adjustable flexible upper support straps. In order to minimize inadvertent damage to the vehicle, the carrier further includes an adjustable pedal pad to be removably affixed to a pedal, an adjustable lower pedal support strap and an adjustable brake lock device.

U.S. Pat. No. 5,269,446, issued Dec. 14, 1993 to Biehn, discloses a bicycle rack for supporting a bicycle in a vertical standing position at the back end of a vehicle such as a recreational vehicle (RV). The bicycle is oriented in a position with its rear wheel lying in a plane that is substantially perpendicular to the back end of the vehicle and with a front fork of the vehicle located above the rear wheel. The bicycle rack includes side-by-side elongated members spaced apart so as to receive a tire and a rim of one of the bicycle wheels. A front lateral member extends between the pair of elongated members and lies along side a rear bumper of vehicle. The device also includes a mechanism for releasably securing the front wheel of the bicycle to the back end of the vehicle.

U.S. Pat. No. 5,337,932, issued Aug. 16, 1994 to Griewahn, discloses a multi-level portable bicycle and cargo rack. The disclosed device includes a lower pair of load carrying arms and an upper pair of load carrying arms. A vertical center post is provided for attachment to the vehicle. Each of the upper and lower pairs of load carrying arms is adapted to carry a bicycle or other cargo.

Some prior known devices, such as U.S. Pat. No. 4,629,104, issued Dec. 16, 1986 to Jacquet, disclose bicycle racks designed for attachment to the luggage carrier of a vehicle. Similarly, U.S. Pat. No. 5,201,911, issued Apr. 13, 1993 to Lee, discloses a bicycle rack mountable on a roof of a vehicle having parallel rails extending longitudinally along the roof. The rack includes a pair of elongated cross members for detachably carrying a sports article such as a bicycle.

While previously known devices have proven to be relatively commercially acceptable for a wide range of applications, each is attended with drawbacks and inherent limitations. For example, all known prior devices are adapted to be removed from the vehicle when not in use. Many known prior devices prohibit access to a vehicle hatch or trunk unless the bicycle and/or device are removed from the vehicle. Still other known devices are positioned entirely on the roof of the vehicle, thereby requiring awkward installation and removal of the bicycles. Still yet other prior known devices are readily subject to theft and are difficult or time consuming to mount to the vehicle. Additionally, the attachment mechanisms for many prior devices frequently subject the vehicle to unnecessary damage during use. Further, many of prior known devices do not sufficiently stabilize the bicycle for the environment encountered during high speed vehicle travel and thereby further subject the bicycle and vehicle to damage.

It is an object of the present invention to provide a different type of vehicle mounted bicycle carrying rack which is both novel in its structure and its operational characteristics, and overcomes the disadvantages and limitations associated with the prior art.

Another object of the present invention is to provide a vehicle mounted bicycle carrying assembly which is an aesthetically and functionally integral part of the vehicle.

A related object of the present invention is to provide a vehicle mounted bicycle carrying assembly for transporting one or more bicycles which inconspicuously forms an integral part of the vehicle.

Yet another object of the present invention is to provide a vehicle mounted bicycle carrying assembly which allows an attached bicycle to be easily moved between a first position for secured transportation of the bicycle and a second position for providing access to a vehicle trunk.

It is a further object of the present invention to provide a vehicle mounted bicycle carrying assembly which deters theft of the bicycle carrying assembly and any attached bicycles.

Still another object of the present invention is to provide a vehicle mounted bicycle carrying assembly which sufficiently and simply stabilizes one or more attached bicycles for high speed vehicle travel.

SUMMARY OF THE INVENTION AND ADVANTAGES

In a first aspect, the present invention is a vehicle mounted bicycle carrying assembly for supporting at least one bicycle in an upward standing position on the upper surface of a vehicle for transport by the vehicle. The vehicle to which the carrying assembly is adapted to be permanently attached includes a deck lid pivotally movable between an open position and a closed position and a roof. The assembly comprises first and second laterally spaced and longitudinally extending rail members affixed to the roof, and an elongated member adapted to retain at least one bicycle for pivotally movement between a first position and a second position about an axis substantially coincident with the elongated member. In one application, the elongated member is adapted to pivotally retain the front fork of a bicycle. A first end portion of the elongated member is adapted to be attached to one of the rail members and a second end portion of the elongated member is adapted to be attached to the other of the rail members.

In the preferred embodiment, the assembly further comprises a spoiler permanently attached to the deck lid. The spoiler integrally includes a longitudinally extending member including a channel adapted to receive the rear wheel of the at least one bicycle. When attached to the vehicle through the assembly of the present invention, the bicycle can be pivoted about its fork to thereby provide access for moving the deck lid to the open position.

In a second aspect, the present invention is a vehicle adapted for carrying a bicycle in an upward standing position. The vehicle includes an upper surface including a roof and a deck lid. The deck lid is pivotally movable between a closed position and an open position. The vehicle further includes a luggage rack arrangement having first and second rail members and an elongated member. The first and second rail members are laterally spaced, longitudinally extending and affixed to the roof. The elongated member includes first and second end portions and is adapted to retain the at least one bicycle for pivotally movement between a first position and a second position about an axis substantially coincident with the elongated member. The vehicle further includes a spoiler permanently attached to the deck lid. The spoiler integrally includes a longitudinally extending member having a channel adapted to receive the rear wheel of the at least one bicycle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
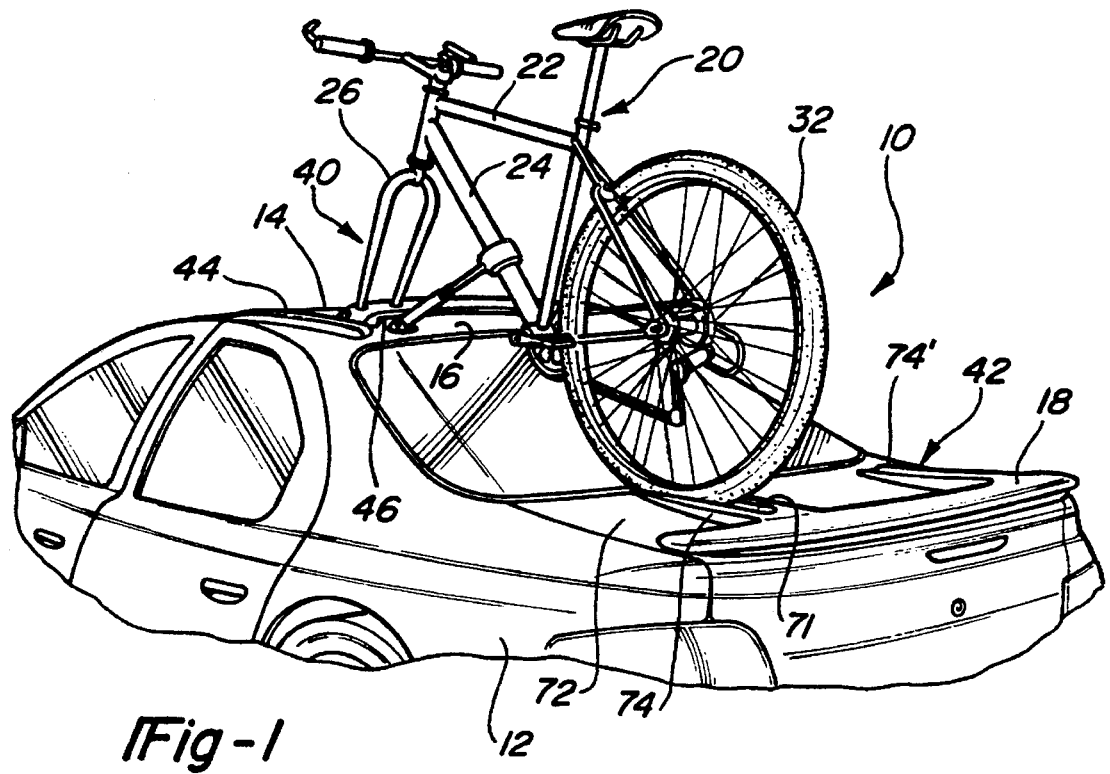
FIG. 1 is a perspective view of a preferred embodiment of a vehicle mounted bicycle carrying assembly constructed in accordance with the teachings of the present invention, the assembly being installed on an exemplary vehicle and shown operatively associated with a bicycle.

Certain terminology is used in the following detailed description for convenience only and is not intended to be limiting. For example, words such as "clockwise" and "counterclockwise" and "front" and "rear" are intended to designate direction or orientation shown in the drawings to which reference is being made. Also in the drawings, where similar reference characters designate like parts throughout several views, illustrated is a preferred embodiment of the present invention. More specifically, the reference numeral 10 generally denotes an exemplary assembly constructed in accordance with the teachings of the present invention. The exemplary assembly is illustrated as a vehicle mounted bicycle carrying assembly 10. However, it will be readily understood by those skilled in the art that the illustrated application is merely illustrative and could be employed in other applications where it is desired to transport articles on a vehicle without departing from the fair scope of the present invention.

Turning now generally to the drawings, the vehicle 12 shown throughout is of conventional construction and includes an upper surface 14. The upper surface 14 is at least partially defined by a roof portion 16 and deck lid 18. The deck lid 18 is pivotally attached to the vehicle 12 for movement between a closed position (as shown in FIG. 1) and an opened position (as shown in FIG. 2) for providing access to a storage area 19.

Figure 2:
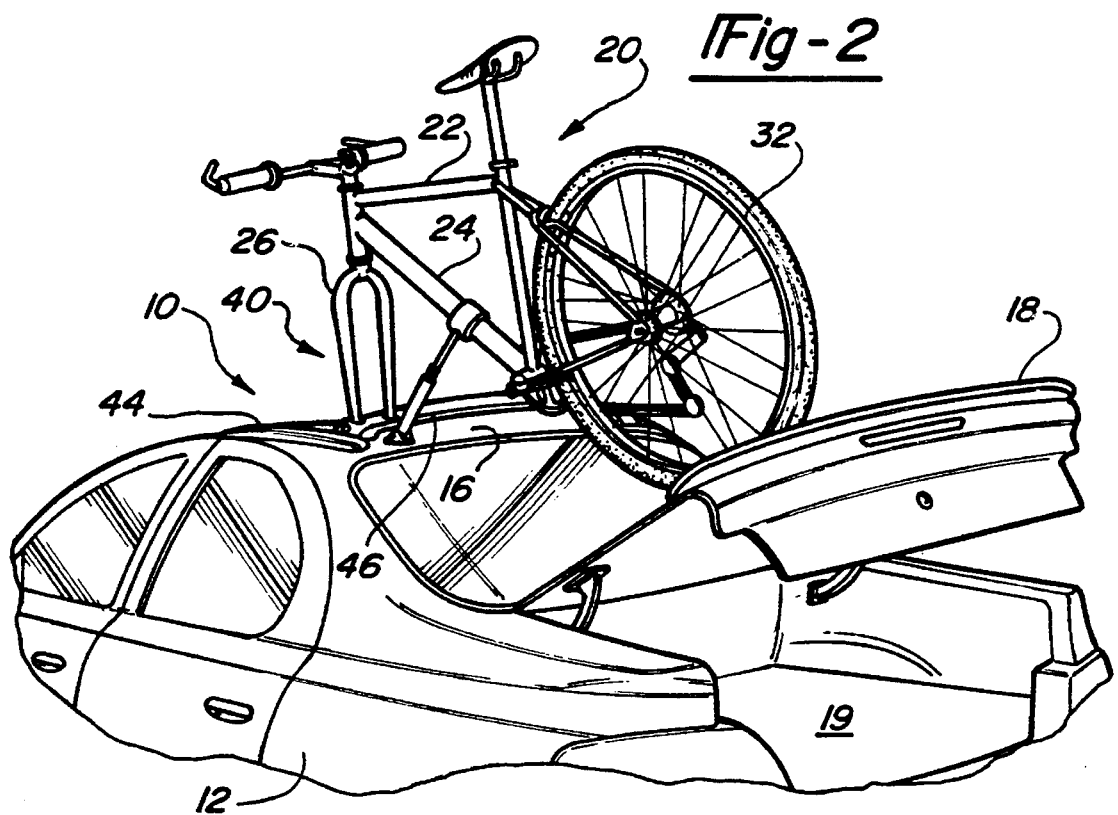
FIG. 2 is a perspective view similar to FIG. 1 illustrating the attached bicycle rotated to a first, intermediate position and the deck lid of the vehicle rotated to a partially open position, and further illustrating in hidden lines the attached bicycle rotated to an upper position and the deck lid of the vehicle rotated to a fully open position.

Shown in FIGS. 1 and 2 is an attached bicycle 20 in operative association with the vehicle mounted bicycle carrying assembly 10 of the present invention. It will be appreciated that the bicycle 20 is conventional in construction and further that the particular bicycle 20 illustrated is merely exemplary. As illustrated, the bicycle 20 includes a frame portion 22 having a down tube 24, a front fork 26 with first and second arms 28, 30, and a rear wheel 32. Also of conventional construction, the distal ends of first and second arms 28, 30 of the front fork 26 are each formed to include an aperture 34 passing therethrough. In normal operation, the apertures 34 rotatably receive an axle shaft of a front wheel (not shown). In this regard, it will be appreciated by those skilled in the art that the bicycle carrying assembly 10 of the present invention can be modified for use on other motor vehicles and further that the assembly 10 can utilized to transport other items.

Figure 3:
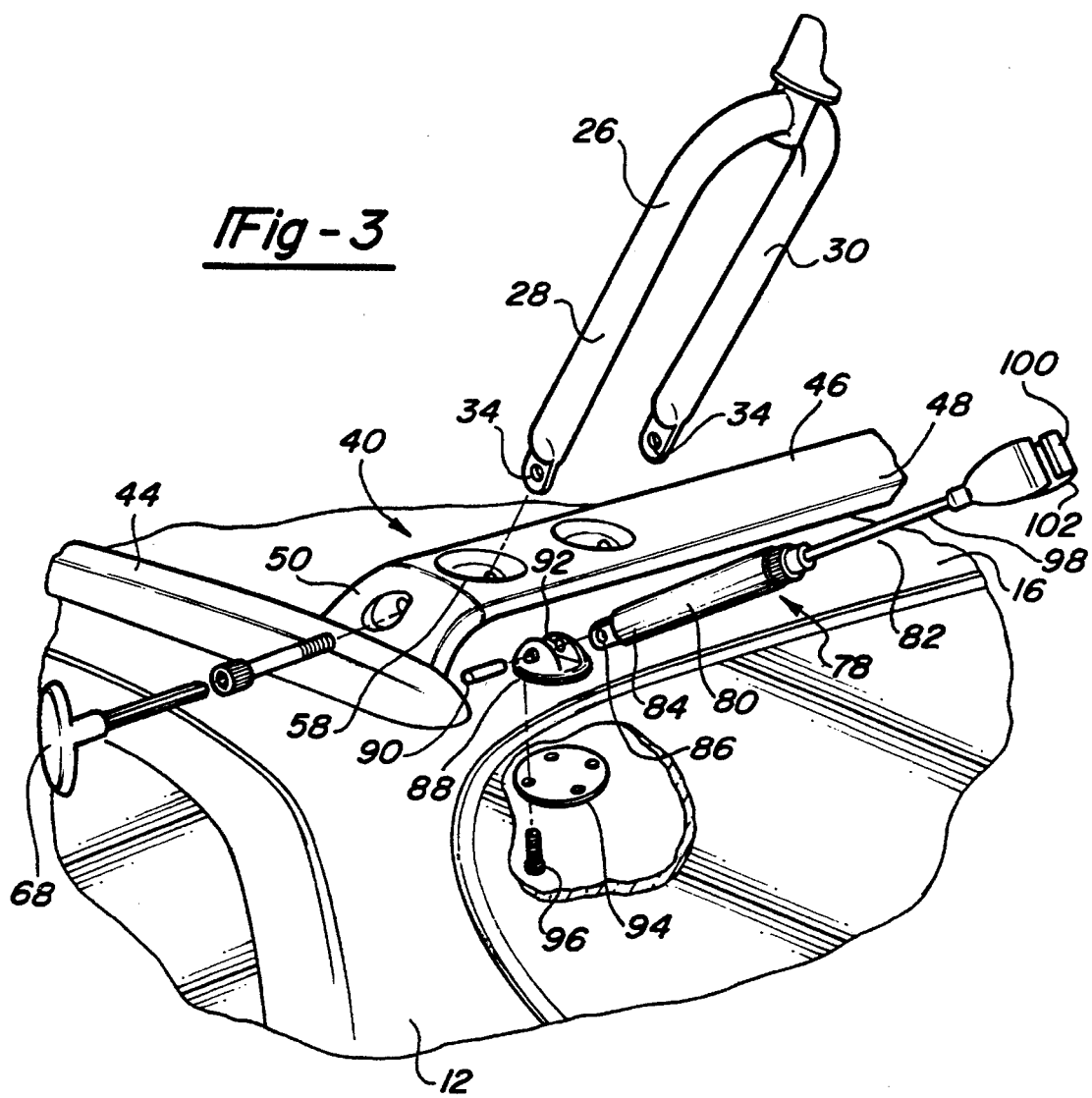
FIG. 3 is a partially exploded and partially cut-away view of a portion of the assembly of FIG. 1.
Figure 4:
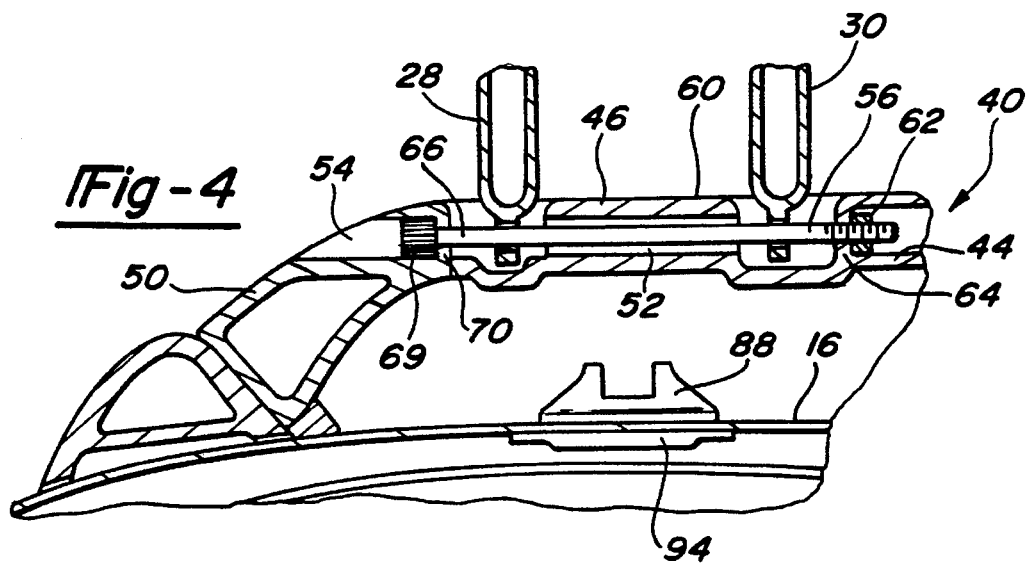
FIG. 4 is a cross-sectional view taken through a portion of the elongated member of the present invention.

FIGS. 1–4 of the drawings illustrate a series of views of the vehicle mounted bicycle carrying assembly 10 of the present invention. More particularly, FIG. 1 shows the bicycle carrying assembly 10 permanently attached to the vehicle 12 and operatively associated with the attached bicycle 20. FIG. 2 is a perspective view similar to FIG. 1 illustrating the deck lid 18 of the vehicle 12 in a partially open position and the attached bicycle 20 rotated counterclockwise to an intermediate position. FIG. 2 additionally illustrates in phantom the deck lid 18 in a fully open position and the attached bicycle rotated to an upper position to an opened position. FIG. 3 is a partially exploded view of a portion of the bicycle carrying assembly 10. Finally, FIG. 4 is a cross-sectional view taken through a portion of the assembly 10 illustrating the pivotal attachment of the bicycle 20 to the assembly 10.

The vehicle mounted bicycle carrying assembly 10 of the present invention is specifically adapted for supporting at least one bicycle 20 in an upward standing position on the upper surface 14 of a vehicle 12 for transport by the vehicle 12. In the exemplary embodiment illustrated, the carrying assembly 10 is adapted to support two bicycles. In this regard, the carrying assembly 10 is a substantial mirror image about a longitudinal centerline coincident with the longitudinal centerline of the vehicle 12. For the remainder of this detailed description, the focus is primarily directed to the left hand portion of the carrying assembly 10, as viewed from the rear of the vehicle 12. It will be appreciated by those skilled in the art that identical structure is located on the right hand portion of the carrying assembly 10 for supporting a second bicycle (not shown). Furthermore, it will be similarly appreciated by those skilled in the art that the carrying assembly 10 could be easily modified to facilitate transportation of three or more bicycles in an upstanding position on the vehicle 12. The number of bicycles which can be transported by utilizing the teachings of the present invention is limited only by the transverse dimension of the vehicle 12 and the required lateral spacing for the particular bicycles mounted thereto.

In the exemplary embodiment illustrated, the carrying assembly 10 of the present invention includes first retaining means 40 for engaging a first portion 26 of the bicycle 20. The carrying assembly 10 further includes second retaining means 42 for engaging a second portion 32 of the bicycle 20. The first retaining means 40 for engaging a first portion 26 of the bicycle 20 is preferably disposed substantially adjacent the roof 14 of the vehicle 12. Further preferably, the first retaining means comprises a luggage rack arrangement 40. The luggage rack arrangement 40 is conventional in construction insofar as it includes first and second rail members 44. The first and second rail members 44 are laterally spaced, longitudinally extending and permanently affixed to the roof 14 of the vehicle 12. While not specifically shown in the drawings, it will be appreciated by those skilled in the art, that the rail members 44 are adapted to cooperate in a conventional manner with a plurality of transverse members (not shown) for retaining luggage and other items on the roof 14 of the vehicle. The luggage rack arrangement 40 of the present invention further includes an elongated member 46 laterally interdisposed between the first and second rail members 44. The exterior appearance of the elongated member 46 is substantially identical to transverse members (not shown) of conventional luggage rack systems. In this regard, the elongated member 46 includes a center portion 48 and a pair of end portions 50. In the exemplary embodiment illustrated, the end portions are connected to the center portion 46 in any suitable manner well-known in the art. However, it will be appreciated by those skilled in the art that alternatively the end portions 50 can be formed integrally with the center portion 46. Each of the end portions 50 are adapted to releasably engage one of the rail members 44. As will further be appreciated by those skilled in the art, the end portions are longitudinally movable along the first and second rail members 44 to facilitate longitudinal positioning of the elongated member 46 above the roof 14. In the embodiment illustrated, the first and second end portions 50 are substantially hollow in construction and are configured so as to vertically displace the center portion 48 of the elongated member 46 from the vehicle roof 14. In the preferred embodiment, each of the end portions 50 of the elongated member 46 is a substantial mirror image of the opposite end portion 50.

The elongated member 44 may be of any suitable construction but is preferably of the cross-section illustrated in FIG. 4. In the application illustrated throughout the drawings, the first portion 26 of the bicycle 20 which the first retaining means engages is the front fork 26 of the bicycle 20. Referring specifically to FIGS. 3 and 4, the central portion 48 of the elongated member 46 is formed to define a longitudinal channel extending at least partially therethrough. In the preferred embodiment, in addition to the channel 52 illustrated in FIG. 4, the central portion 48 of the elongated member 46 includes a second channel (not shown) located at the opposite end thereof. Alternatively, the central portion 48 can be formed to include a longitudinal channel which extends across substantially the entire length of the central portion 46. In some applications, such a construction may be preferable due to the reduced material necessary to construct the central portion 48 and the corresponding weight reduction. The first and second end portions 50 are formed to include a similar channel 54 which is aligned so as to be substantially co-linear with the channel 52. The channels 52, 54 are adapted to receive a threaded fastener 56.

The center portion 48 of the elongated member 46 is additionally formed to include a pair of recesses 58 located on an upper surface 60. The recesses 60 extend downwardly and intersect the longitudinally extending channel 52 of the center portion 46. The recesses 58 are laterally spaced apart so as to receive the distal ends of the first and second arms 28, 30 of the fork 26. In the exemplary embodiment illustrated, the recesses 58 are generally cylindrical. However, it will be appreciated by those skilled in the art, that the recesses 58 can alternatively be elongated slots or any other suitable geometry to permit pivotal movement of arms 28, 30, as discussed more fully below.

The distal ends of the first and second arms 28, 30 are pivotally retained within the central portion 46 by the threaded fastener 56. A nut 62 is attached to an inwardly extending circumferential flange 64 disposed within channel 52. The nut 62 is fixed to the inwardly extending circumferential flange 64 so as to prevent rotation and is adapted to threadably engage the fastener 56. At a first end 66, the threaded fastener 56 preferably includes a hex head 69. A hex tool 68 or other tool suitably configured to mate with the first end 66 of threaded fastener 56 may be inserted into channel 54 for inserting and removing threaded fastener 56. An inwardly projecting circumferential flange 70 is adapted to abut the hex head 69 when the fastener 56 is fully engaged with the nut 62. In the exemplary embodiment illustrated, the length of the threaded fastener 56 is sized so that the entire threaded fastener 56 is disposed within the channels 52, 54 when hex head 69 abuts flange 70. When the threaded fastener 56 is disengaged from the nut 62, the hex head 69 is readily accessible within channel 54 for removal therefrom.

In the preferred embodiment, the second retaining means 42 for engaging a second portion 32 of the bicycle 20 includes rear wheel locating means. The rear wheel locating means preferably comprises a longitudinally disposed channel 71 permanently attached to an upper surface 72 of the deck lid 18.

Further, in the preferred embodiment, the second retaining means comprises a spoiler (commonly referenced with the second retaining means as 42). The spoiler 42 includes at least one longitudinally extending member 74. Each longitudinally extending member 74 is formed to define a longitudinally extending channel, such as channel 71: In the preferred embodiment, the spoiler 42 includes two such longitudinally extending member 74, 74', each of which are adapted to laterally locate the rear wheel 32 of an attached bicycle. In the embodiment illustrated, the longitudinally extending member 74 is specifically adapted to cooperate with recesses 58 for securing a first bicycle to vehicle 12. It will be appreciated by those skilled in the art that alternate to the spoiler 42 shown throughout the drawings, the second retaining means 42 of the present invention may comprise an independently configured longitudinally extending channel disposed on the upper surface 72 of the deck lid 18. Significantly, the second retaining means is aesthetically and functionally an integral part of the vehicle 12 which is intended to permanently and substantially inconspicuously remain on the vehicle 12.

The second retaining means 42 of the present invention further includes a strap or flexible cord (not shown) which is removably attachable to the elongated member 74. In the preferred embodiment, the strap securely locates the rear wheel 32 of the bicycle 20 relative to the elongated member 74. Alternatively, the rear wheel 32 may be held adjacent the longitudinally extending channel 74 in any suitable manner well known in the art.

The vehicle mounted bicycle carrying assembly 10 of the present invention further preferably includes support means for supportably engaging the attached bicycle when the bicycle 20 is rotated about the fork 26 so as to raise the rear tire 32 from the deck lid 18. In the preferred embodiment, the support means comprises a gas prop 78. The gas prop 78 is conventional in construction insofar as it includes a main body portion 80 and an arm 82 extendable therefrom. At a first end 84, the main body portion 80 of the gas prop 78 is formed to include an aperture 86. The aperture 86 is adapted to cooperate with a mounting bracket 88 attached to the roof 14 of the vehicle 12. A pin 90 passes through the aperture 86 in addition to a pair of apertures 92 formed on the bracket 88 to thereby pivotally retain the gas prop 78 to the roof 14. The pin 90 is preferably removable, such as a cotter pin, so that gas prop 78 can be removed from the vehicle 12 when a bicycle 20 is not attached thereto. A reinforcing plate 94 is located adjacent the under side of the roof 14 through which bolts 96 pass through and engage the bracket 88. It will be appreciated by those skilled in the art the assembly 10 may alternatively incorporate any other structure suitable for momentarily retaining the bicycle in a raised position.

At a distal end 98, the arm 82 of the gas prop 78 is fixedly connected to an attachment portion 100. The attachment portion 100 includes an arcuate segment 102 which is operative to cooperatively engage the down tube 24 of the bicycle 20. Upon counterclockwise rotation of the bicycle 20 as shown in FIG. 2, the arm 82 of the gas prop extends. The internal construction of the main body portion 80 of the gas prop is damped so as to oppose retraction. The operation of the gas prop 78 of the present invention is substantially similar to gas props incorporated to support doors, such as rear mounted hatch doors for minivans, utility vehicles and the like. The gas prop 78 is damped to such a degree so as to substantially maintain the rotational position of the bicycle 20 as it is raised from the deck lid 18. The calibration of the gas prop 78 provides retraction of the arm 80 in response to slight urging by an operator.

The present invention, therefore, eliminates the necessity of providing a complicated self-supporting structure such as taught by prior art devices for the transportation of bicycles. Instead, the invention provides a vehicle mounted bicycle carrier arrangement 10 having a configuration which permanently cooperates with the vehicle to create a simplified and yet rigid and secured structure for transport. In addition, the vehicle mounted bicycle carrier assembly 10 forms an aesthetically pleasing and permanent part of the vehicle 12 which does not require attachment to and removal from the vehicle 12 for each use.

For increased stability of the bicycle 20 during movement between the first position (as shown in FIG. 1) and the second position (as shown in FIG. 2), it may be desirable to incorporate an additional stabilizer (not shown). In this regard, a stabilizer bar can be used to operatively join the fork 26 and the frame portion 22 to thereby prohibit downward pivoting of the bicycle frame 22 about the stem when the rear wheel 32 is raised (as shown in FIG. 2) from its mounted position adjacent the deck lid 18. In one application, the stabilizer bar operatively interconnects the fork 26 and down tube 24 of the frame portion 22 for substantially preventing relative motion therebetween. However, it will be appreciated by those skilled in the art that such an additional stabilizer can alternatively interconnect the fork 26 and a different portion of the frame 22.

In order to provide a more complete understanding of the present invention, the operation of the assembly 10 heretofore detailed will now be described. As shown in the drawings and as discussed above, the assembly 10 of the present invention is intended to be a substantially permanent part of the vehicle 12. In this regard, the luggage rack arrangement 40 and the spoiler 42 are permanently attached to the vehicle 12. Thus, preparation of the vehicle 12 for mounting of the bicycle 20 is minimized.

To transport a bicycle with the assembly 10 of the present invention, the front wheel (not shown) is disengaged from the front fork 26 and stored within the occupant area or the storage area 19. Next, the rear wheel 32 is laterally located with respect to the vehicle 12 within longitudinally extending channel 71 of the spoiler 42. The arms 28, 30 of the fork 26 are received into the recesses 58. The threaded fastener 56 is inserted through the channel 54 and extended into channel 52 and through the apertures 34 in the arms 28, 30, thereby pivotally retaining the fork 26. Rotation of the threaded fastener 56 causes engagement with the nut 62. The pin 90 is passed through the aperture 86 in addition to a pair of apertures 92 formed on the bracket 88 to thereby pivotally retain the gas prop 78 to the roof 14. The attachment portion 100 is engaged with the down tube 24 of the bicycle 20. The bicycle 20 can be further secured and stabilized by a tie strap (not shown) used to secure the rear wheel 32 to the spoiler 42. Optionally, a stabilizer bar (not shown) may operatively interconnect the fork 26 and down tube 24 of the frame portion 22 for substantially preventing relative motion therebetween.

To provide access to the storage area 19 through pivotal movement of the deck lid 18, any mechanism utilized to secure the rear wheel 32 to the spoiler 42 is disengaged from the bicycle 20. The bicycle 20 is subsequently rotated from a lowered position (as shown in FIG. 1) to a raised position (as shown in phantom in FIG. 2). The resistance of the gas prop 78 operates to substantially maintain the bicycle 20 in any position elevated from the deck lid 18 (e.g. the fully raised position shown in phantom in FIG. 2 or the partially raised position shown in solid lines in FIG. 2). The resistance of the gas prop 78 is easily overcome through the application of a downward force to return the rear wheel 32 to the deck lid 18.

The foregoing discussion discloses and describes merely exemplary applications of the teachings of the present invention. One skilled in the art will readily recognize from such discussion, and from the accompanying drawings and claims, that various changes, modifications and variations can be made therein without departing from the spirit and scope of the invention as defined in the following claims.

What is claimed:

1. A vehicle mounted bicycle carrying assembly for supporting at least one bicycle in an upward standing position on the upper surface of a vehicle for transport by the vehicle, the vehicle being of the type including a deck lid pivotally movable between an open position and a closed position and a roof, the assembly comprising:

first retaining means for engaging a first portion of the at least one bicycle, said first retaining means adapted to be disposed substantially adjacent the roof of the vehicle; and second retaining means for engaging a second portion of the at least one bicycle, said second retaining means adapted to be disposed on the deck lid of the vehicle wherein said first retaining means includes means for pivotally engaging said first portion of the at least one bicycle such that the at least one bicycle is pivotally moveable about said first portion between a first position and a second position, such that pivotal movement of said at least one bicycle about said first portion from said first position to said second position permits the deck lid to be moved between the closed position and the open position, respectively, wherein said second portion engages said second retaining means therebetween.

2. The vehicle mounted bicycle carrying assembly of claim 1, wherein said first portion of the at least one bicycle is a front fork.

3. The vehicle mounted bicycle carrying assembly of claim 2, further comprising support means for supportively engaging the at least one bicycle when the at least one bicycle is in said second position.

4. The vehicle mounted bicycle carrying assembly of claim 3, wherein said first retaining means comprises a laterally extending elongated member which is adapted to be fixedly supported above said roof in generally parallel relationship thereto.

5. The vehicle mounted bicycle carrying assembly of claim 4, wherein said first retaining means further comprises supporting structure for supporting said laterally extending elongated member above said roof.

6. The vehicle mounted bicycle carrying assembly of claim 5, wherein said elongated member includes first and second end portions, and further wherein said supporting means comprises first and second laterally spaced and longitudinally extending rail members affixed to said roof, said first end portion of said elongated member releasably affixed to one of said rail members, and said second end portion of said elongated member releasably affixed to the other of said rail members.

7. The vehicle mounted bicycle carrying assembly of claim 6, wherein said second portion of said bicycle is the rear wheel and further wherein said second retaining means comprises rear wheel locating means for receiving and locating said rear wheel relative to the deck lid.

8. The vehicle mounted bicycle carrying assembly of claim 7, wherein said rear wheel locating means comprises a longitudinally extending member including a channel for receiving said rear wheel of the at least one bicycle, said longitudinally extending member being attached to the deck lid.

9. The vehicle mounted bicycle carrying assembly of claim 7, wherein said rear wheel locating means comprises a spoiler attached to the deck lid, said spoiler integrally including a longitudinally extending member including a channel adapted to receive said rear wheel of the at least one bicycle.

10. The vehicle mounted bicycle carrying assembly of claim 9, wherein said at least one bicycle comprises two bicycles.

11. A vehicle mounted bicycle carrying assembly for supporting at least one bicycle in an upward standing position on the upper surface of a vehicle for transport by the vehicle, the vehicle being of the type including a deck lid pivotally movable between an open position and a closed position and a roof, the assembly comprising:

first and second laterally spaced and longitudinally extending rail members adapted to be affixed to the roof;

an elongated member including a center portion, a first end portion, and a second end portion, said first end portion of said elongated member being attached to one of said rail members and said second end portion of said elongated member being attached to the other of said rail members, said center portion being adapted to pivotally receive a fork of at least one bicycle for pivotally movement of the at least one bicycle between a first position and a second position about an axis substantially coincident with said center portion; and a spoiler adapted to be permanently attached to the deck lid, said spoiler integrally including at least one longitudinally extending member including a channel adapted to receive said rear wheel of the at least one bicycle.

12. The vehicle mounted bicycle carrying assembly of claim 11, wherein said first and second end portions are longitudinally adjustable with respect to said first and second rail members.

13. The vehicle mounted bicycle carrying assembly of claim 11, further comprising an adjustable support mechanism for supportively engaging the at least one bicycle when the at least one bicycle is in said second position.

14. The vehicle mounted bicycle carrying assembly of claim 13, wherein said adjustable support mechanism comprises a gas prop adapted to be pivotally attached to the roof.

15. The vehicle mounted bicycle carrying assembly of claim 13, wherein the at least one bicycle comprises two bicycles.

16. In combination with a bicycle of the type having a front fork, a rear wheel, and a frame, and a bicycle rack assembly for holding at least one bicycle in an upward standing position on the upper surface of a vehicle, the vehicle being of the type including a deck lid pivotally movable between an open position and a closed position and a roof, the improvement comprising:

a luggage rack arrangement including first and second rail members and an elongated member said first and second rail members being laterally spaced, longitudinally extending and adapted to be affixed to the roof, the elongated member including first and second end portions and being adapted to pivotally retain a first portion of the at least one bicycle for pivotal movement between a first position and a second position about an axis substantially coincident with said elongated member, said first and second end portions each being affixed to said first and second rail members, respectively; and a spoiler adapted to be permanently attached to the deck lid, said spoiler integrally including a longitudinally extending member including a channel adapted to receive the rear wheel of the at least one bicycle.

17. The combination of claim 16, wherein said first and second end portions are longitudinally adjustable with respect to said first and second rail members.

18. The combination of claim 17, wherein the at least one bicycle comprises two bicycles.

* * * * *